US008089962B2

(12) United States Patent
Lin

(10) Patent No.: US 8,089,962 B2
(45) Date of Patent: Jan. 3, 2012

(54) METHOD, SYSTEM AND APPARATUS FOR FILTERING PACKETS

(75) Inventor: Yangbo Lin, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 116 days.

(21) Appl. No.: 12/342,809

(22) Filed: Dec. 23, 2008

(65) Prior Publication Data

US 2009/0103541 A1 Apr. 23, 2009

Related U.S. Application Data

(63) Continuation of application No. PCT/CN2007/070179, filed on Jun. 26, 2007.

(30) Foreign Application Priority Data

Jun. 28, 2006 (CN) .......................... 2006 1 0090562

(51) Int. Cl.
*H04L 12/56* (2006.01)
(52) U.S. Cl. .......................... 370/389; 370/392; 370/401
(58) Field of Classification Search .................. 370/230, 370/230.1, 231, 235, 252, 389, 392, 400, 370/401, 471, 475; 709/231, 236, 245
See application file for complete search history.

(56) References Cited

U.S. PATENT DOCUMENTS

| 7,653,061 | B2 * | 1/2010 | Park et al. ...................... 370/392 |
| 2003/0043740 | A1 * | 3/2003 | March et al. ................... 370/229 |
| 2003/0108030 | A1 * | 6/2003 | Gao ............................... 370/351 |
| 2003/0161305 | A1 | 8/2003 | Hakkarainen et al. |
| 2004/0100972 | A1 * | 5/2004 | Lumb et al. .................... 370/401 |
| 2004/0114741 | A1 | 6/2004 | Ngo |
| 2004/0184467 | A1 | 9/2004 | Watanabe |
| 2006/0221850 | A1 * | 10/2006 | Buckley et al. ................ 370/252 |
| 2007/0086486 | A1 * | 4/2007 | Park et al. ...................... 370/474 |

FOREIGN PATENT DOCUMENTS

| CN | 1505320 A | 6/2004 |
| CN | 1578227 A | 2/2005 |

(Continued)

OTHER PUBLICATIONS

Search Report issued in corresponding PCT Application No. PCT/CN2007/070179; mailed Sep. 20, 2007.

(Continued)

*Primary Examiner* — Hassan Phillips
*Assistant Examiner* — Duc Duong
(74) *Attorney, Agent, or Firm* — Brinks Hofer Gilson & Lione

(57) ABSTRACT

The present disclosure discloses a method, system, and apparatus for filtering packets. The method includes setting packet filtering information that uniquely identifies the basic characteristics of a media stream in an Internet Protocol version 6 (IPv6)-based packet header. As an apparatus for filtering packets, a media gateway (MG) uses the packet filtering information sent by the media gateway controller (MGC) to filter packets for the media stream when transferring the media stream. The method, system, and apparatus enable packet filtering for the media streams in an IPv6-based PS network. Moreover, the filtering conditions in the packet filtering information in the present disclosure is triplet information that uniquely identifies the basic characteristics of a media stream and can be obtained from the IPv6 packet header, thus reducing the complexity of the packet filtering process.

15 Claims, 2 Drawing Sheets

300

The MGC sets the packet filtering information that uniquely identifies the basic characteristics of a media stream in an IPv6-based packet. header.

301

The MG performs packet filtering for the media stream by using the packet filtering information sent by the MGC before transferring the media stream.

FOREIGN PATENT DOCUMENTS

CN    1711728 A    12/2005

OTHER PUBLICATIONS

European Search Report issued in corresponding European Patent Application No. 07764120.7; issued Jun. 24, 2009.

Written Opinion of the International Searching Authority issued in corresponding PCT Patent Application No. PCT/CN2007/070179, mailed Sep. 20, 2007.

First Office Action issued in corresponding Chinese Patent Application No. 200610090562.5, mailed Apr. 10, 2009.

International Telecommunication Union, Series H: Audiovisual and Multimedia Systems: Infrastructure of audiovisual services—Communication Procedures. Gateway Control Protocol: Version 3. H.248.1, Sep. 2005.

\* cited by examiner

METHOD, SYSTEM AND APPARATUS FOR FILTERING PACKETS

CROSS REFERENCES TO RELATED APPLICATIONS

This application is a continuation application of PCT/CN2007/070179, filed Jun. 26, 2007, which claims priority to the Chinese Patent Application No. 200610090562.5, filed with the Chinese Patent Office on Jun. 28, 2006 and entitled "Method for Filtering Packets", the contents of which are incorporated herein by reference in their entirety.

FIELD OF THE DISCLOSURE

The present disclosure relates to network communication security technology, and in particular, to a method, system, and apparatus for filtering packets in a next generation network (NGN) packet switched (PS) network based on the Internet Protocol version 6 (IPv6).

BACKGROUND OF THE DISCLOSURE

FIG. 1 is a networking diagram of a single network of an NGN. As shown in FIG. 1, the media gateway controller (MGC) and the media gateway (MG) are two key components of the NGN. The MGC is responsible for the call control function, and the MG is responsible for the service bearer function so as to separate the call control plane from the service bearer plane. Thus the network resources can be shared fully, equipment upgrade processes and service extensions may be simplified, and development and maintenance costs may be reduced greatly. Under the control of the MGC, a Real-time Transfer Protocol (RTP) media stream is established for communication between different MGs.

A control protocol needs to be applied between the MGC and the MG for interworking between them. The media gateway control protocol is a main protocol for communication between the MG and the MGC. The currently prevalent protocols are H.248/MeGaCo Protocol and Media Gateway Control Protocol (MGCP).

Taking the H.248 Protocol as an example, various resources on the MG are abstractly represented by terminations. Terminations are categorized into physical terminations and ephemeral terminations. Physical terminations are physical entities which exist semi-permanently, for example, time division multiplex (TDM) paths. Ephemeral terminations refer to the public resources which are requested for an ephemeral purpose and will be released after being used, for example, RTP streams. Specially, a root termination refers to the whole MG. The combinations between terminations are abstractly represented by contexts. Because a context may include multiple terminations, a topology is used to describe the interrelations between terminations.

Based on the abstract model of MGCP, a call connection is actually an operation on the termination and the context. Such operations are performed through Commands, Requests, and Replies between the MGC and the MG. Commands include Add, Modify, Subtract, Move, AuditValue, AuditCapabilities, Notify, ServiceChange and etc. Parameters of Commands, also known as descriptors, are categorized into property, signal, event, and statistic categories. The parameters with service relevance are logically aggregated into a package.

Under the control of an MGC, the MG is responsible for converting and transferring media streams between a user and a PS network and between PS networks in different IP domains. FIG. 2 is a networking diagram for IP cross-domain interworking in an NGN. As shown in FIG. 2, the system includes two network domains: IPa and IPb. MGCa are media gateway controllers in the IPa network domain, and MGCb are media gateway controllers in the IPb network domain. MGCa and MGCb are designed to control the MG of the IPa network domain and the MG of the IPb network domain, respectively. MGia and MGib are edge MGs designed to implement communication between MGs of adjacent network domains. The MGa can perform media conversion and transfer between a Plain Old Telephone Service (POTS) user and an RTP media stream. The MGb can perform media conversion and transfer between a TDM trunk and an RTP media stream. The MGia and MGib can perform media conversion and transfer between RTP media streams.

To ensure the quality of service (QoS) and communication security, the MGC should perform packet filtering for the media streams transferred (e.g., received and transmitted) by the MG, i.e., permitting or forbidding the media streams of certain characteristics to be input or output through the MG.

Currently, in an IPv4-based PS network, a media stream can be uniquely identified by the basic characteristics of a quintuplet (e.g., source address, source port, destination address, destination port, and protocol type) thus filtering the packets for a specific media stream by the elements in the quintuplet. However, all elements in the quintuplet are not available from the IP packet header and some elements such as source port or destination port need to be obtained by resolving the IP packet body. The IP packet body involves upper-layer protocols or segments or involves other factors such as encryption so the resolution is difficult and the packet filtering is more complex.

SUMMARY OF THE DISCLOSURE

An embodiment of the present disclosure provides a method, system, and apparatus for filtering packets to simplify the packet filtering process for media streams in a PS network.

A method for filtering packets provided in an embodiment of the present disclosure includes setting packet filtering information that uniquely identifies basic characteristics of a media stream in an IPv6-based packet header and using the packet filtering information to filter packets for the media stream when transferring the media stream.

A system for filtering packets provided in an embodiment of the present disclosure includes a media gateway controller (MGC) and at least one media gateway (MG). The MGC is adapted to send preset packet filtering information to each MG, in which the packet filtering information uniquely identifies basic characteristics of a media stream in an IPv6-based packet header and the MG is adapted to filter packets for the media streams to be transferred according to the packet filtering information sent by the MGC.

An apparatus for filtering packets provided in an embodiment of the present disclosure includes a first unit and a second unit, wherein the first unit is adapted to receive packet filtering information, in which the packet filtering information uniquely identifies the basic characteristics of a media stream in an IPv6-based packet header and the second unit is adapted to filter packets for the media streams according to the received packet filtering information.

As seen from the above technical solution, the technical solution of the present disclosure provides at least the following technical effect: the MGC sets the packet filtering information that uniquely identifies the basic characteristics of a media stream in an IPv6-based packet header. The MG uses the packet filtering information sent by the MGC to filter packets for the media streams when transferring the media streams. The technical solution of the present disclosure enables packet filtering for media streams in an IPv6-based PS network. The filtering conditions in the packet filtering information in the present disclosure are triplet information that uniquely identifies the basic characteristics of a media stream and can be obtained from the IPv6 packet header, thus reducing the complexity of the packet filtering process.

DETAILED DESCRIPTION OF THE DISCLOSURE

In an embodiment of the present disclosure, a media gateway controller (MGC) sets the packet filtering information that uniquely identifies the basic characteristics of a media stream in an IPv6-based packet header. The MG uses the packet filtering information sent by the MGC to filter packets for the media streams when transferring the media streams.

For better understanding of the technical solution, objectives, and merits of the present disclosure, the present disclosure is hereinafter described in detail with reference to accompanying drawings and preferred embodiments.

Figure 1:
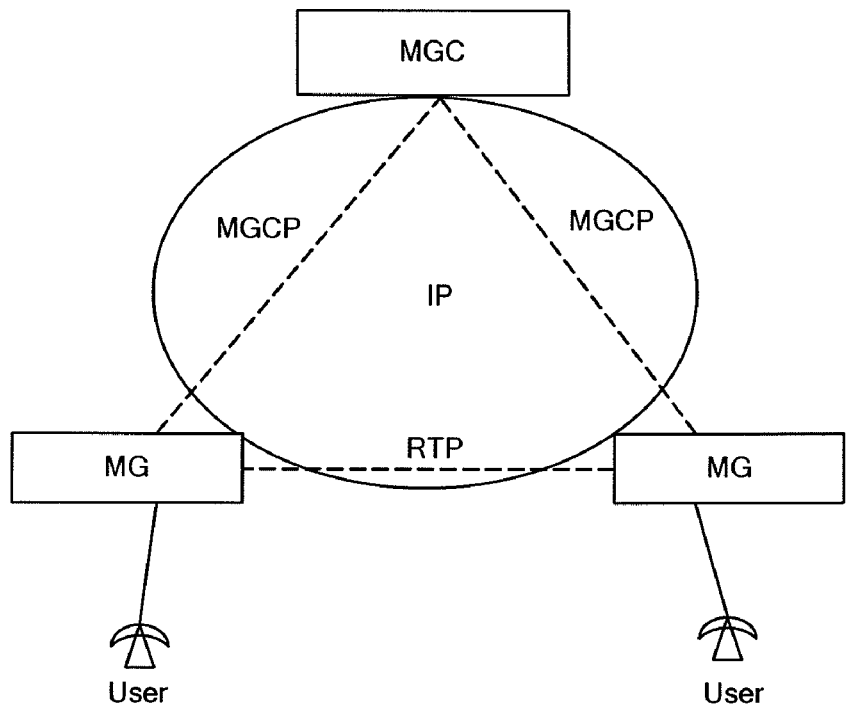
FIG. 1 is a networking diagram of a single network of an NGN.
Figure 2:
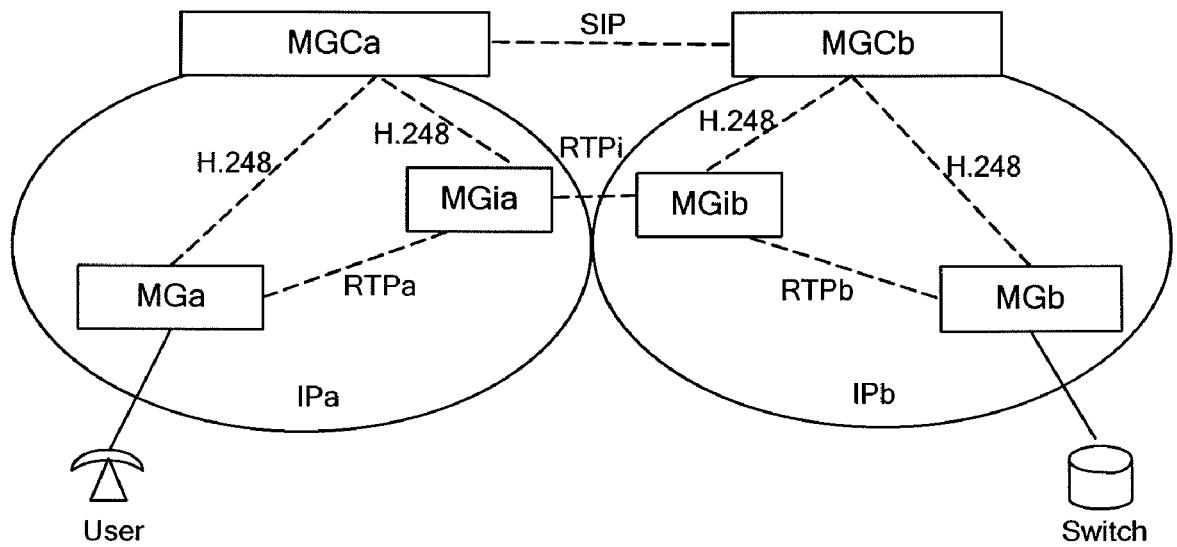
FIG. 2 is a networking diagram of IP cross-domain inter-working in an NGN.
Figure 3:
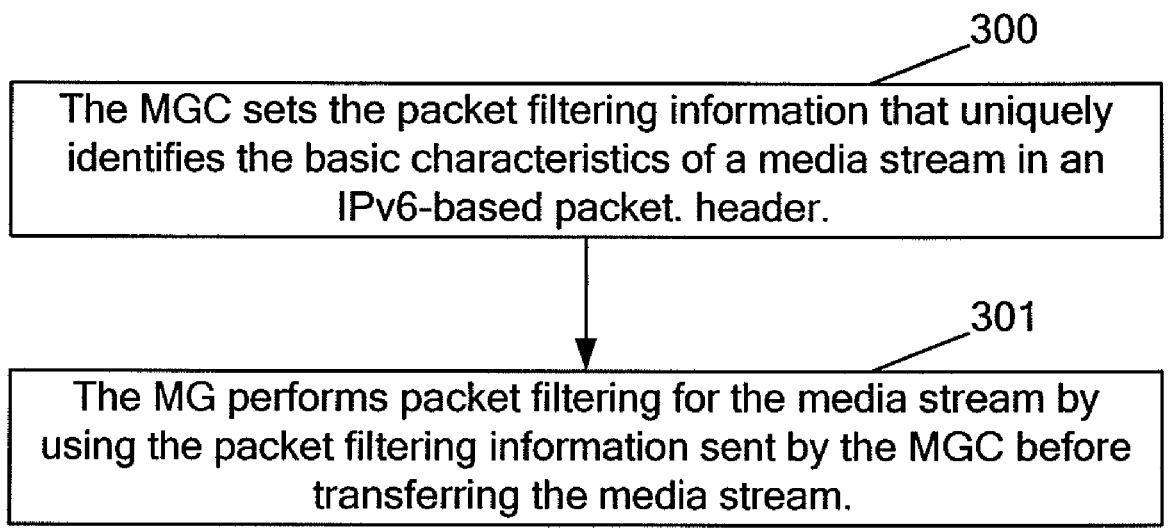
FIG. 3 is a flowchart of the method for filtering packets according to an embodiment of the present disclosure.

FIG. 3 is a flowchart of the method for filtering packets according to an embodiment of the present disclosure. The method includes the following steps:

Step 300: The MGC sets the packet filtering information that uniquely identifies the basic characteristics of a media stream in an IPv6-based packet header.

The packet filtering information in this embodiment is used for packet filtering for a specified media stream based on the elements in a triplet. The packet filtering information may be specific to a specified termination on an MG or specific to the whole MG. The packet filtering information includes filtering condition information and filtering control information.

The filtering condition information includes the elements in a characteristic triplet of an IP packet in an IPv6-based PS network (e.g., source address, destination address, and flow label). A range or a set can be represented by the wildcard mode or partial wildcard mode. For example, the source address in partial wildcard mode "1.1.1.*" represents any address from 1.1.1.0 to 1.1.1.255, in which "*" represents any valid value.

The filtering control information is a mode of filtering packets for the media streams that meet the filtering conditions in the packet filtering information. Filtering control information includes:

source address filtering on-off: indicates whether to use the source address to participate in filtering packets for media streams;

destination address filtering on-off: indicates whether to use the destination address to participate in filtering packets for media streams;

flow label filtering on-off: indicates whether to use the flow label to participate in filtering packets for media streams;

combined relation: indicates whether the filtering condition information participates in filtering packets for the media streams separately (i.e., an OR relation exists between different entries of the filtering condition information) or participates in filtering packets for the media streams jointly (i.e., an AND relation exists between different entries of filtering condition information); and combined effect: indicates whether to permit or prohibit transfer of the media streams that meet the filtering conditions.

It should be noted that the filtering condition information may include all elements of a triplet without being affected by the corresponding elements in the filtering control information or may include any combination of the elements of the triplet, depending on whether the control on-off of the corresponding element in the filtering control information is turned on.

The method for representing packet filtering information is described below, supposing the foregoing packet filtering information is set through the properties extended in the H.248 protocol. The extended properties include:

Flow Label Mask (FLM) property: indicates the flow label information. The FLM property is a string, and the value of the FLM property is consistent with the value of the flow label field in the IPv6 packet header. The FLM property may occupy 20 bits and may be expressed in wildcard mode or partial wildcard mode.

Source Address Mask (SAM) property: indicates the source address information. The SAM property is a string, and the value of the SAM property is consistent with the value of the source address field in the IPv6 packet header. The SAM property may occupy 128 bits and may be expressed in hexadecimal segments in wildcard mode or partial wildcard mode.

Destination Address Mask (DAM) property: indicates the destination address information. The DAM property is a string, and the value of the DAM property is consistent with the value of the destination address field in the IPv6 packet header. The DAM property may occupy 128 bits and may be expressed in hexadecimal segments in wildcard mode or partial wildcard mode.

Flow Label Filtering (FLF) property: indicates the flow label filtering on-off information. The type of the FLF property is Boolean. The value of the FLF property is "Off" or "On" and the default value is "Off".

Source Address Filtering (SAF) property: indicates the source address filtering on-off information. The type of the SAF property is Boolean. and The value of the SAF property is "Off" or "On" and the default value is "Off".

Destination Address Filtering (DAF) property: indicates the destination address filtering on-off information. The type of the DAF property is Boolean. The value of the DAF property is "Off" or "On" the default value is "Off".

Combined Relation (CR) property: indicates the combined relation information. The type of the CR property is Boolean. The value of the CR property is "AND" or "OR" and the default value is "AND".

Combined Effect (CE) property: indicates the combined effect information. The type of the CE property is Boolean. The value of the CE property is "Permit" or "Prohibit", and the default value is "Permit".

Step 301: The MG performs packet filtering for the media stream by the packet filtering information sent from the MGC when transferring the media stream. The properties corresponding to the foregoing packet filtering information may be set in an existing package in the H.248 protocol, i.e., Gate Management Package or set in a newly defined package for packet filtering information that uniquely identifies the basic characteristics of a media stream in an IPv6 packet header, i.e., a newly defined package may be an FL-based Ingoing Packet Filtering (FLIPF) Package that performs packet filtering for the media streams received by the MG or an FL-based Outgoing Packet Filtering (FLOPF) Package that performs packet filtering for the media streams sent by the MG.

The detailed manner for filtering packets for media streams is as follows:

When the MGC needs to perform packet filtering for media streams to ensure security or QoS, the MGC decides the filtering condition information and filtering control information to be used for the media streams received and/or sent by the MG respectively according to certain security or QoS policies and sends them to the MG through the property items in the FLIPF package and FLOPF package. According to the relevant properties in the packet filtering information sent by the MGC, the MG performs packet filtering for the media streams that meet the filtering conditions according to the filtering control information. The filtering conditions are met if the information displayed by the filtering conditions contains the corresponding information of the media streams.

If the values of the three properties FLF, SAF, and DAF are "On", the corresponding filtering conditions are applied to comparison with the characteristics of the media streams to be filtered. If the value of the CR property is "And", the comparison result is "True" only if the characteristics of the media streams to be filtered meet the all filtering conditions applied. If the value of the CR property is "Or", the comparison result is "True" if the characteristics of the media streams to be filtered meet one of the filtering conditions applied. If the value of the CE property is "Permit", it is permitted to receive or send the media streams to be filtered only if the foregoing comparison result is "True". If the value of the CE property is "Prohibit", it is prohibited to receive or send the media streams to be filtered if the foregoing comparison result is "True".

It should be noted that if the MGC has not sent any property related to packet filtering for the media streams received or sent by the MG, no packet filtering needs to be performed by the MG for the received or sent media streams. The MGC can send the filtering condition information and the filtering control information to the MG concurrently or first send the filtering condition information and then send the filtering control information to the MG.

If any problem occurs in the process of sending the packet filtering information and makes the MG unable to apply the packet filtering information sent by the MGC, the MG returns a corresponding error code to the MGC.

A typical application of the method of the present disclosure is described below, supposing the H.248 protocol is adopted between the MGC and the MG. The filtering condition information and the filtering control information for filtering packets for the media streams received and/or sent by the MG is set through the properties of the FLIPF package and the FLOPF package in the H.248 protocol. When the MGC does not intend to perform packet filtering for the media streams on the MG, the MGC sends no FLIPF or FLOPF package to the MG, and the MG may not perform packet filtering for the media streams received or sent by the MG according to the default value and permit any media stream to access the MG freely. When the MGC decides to only permit the media streams received by the MG which come from the address "1.1.1.*" or the flow label of which is "9999" and prohibits the media streams of any flow label that are sent by the MG to the address "12.34.56.78", in the properties of the FLIPF package sent by the MGC to the MG: FLM=9999, SAM=1.1.1.*, FLF=On, SAF=On, CR=Or, and CE=Permit; in the properties of the FLOPF package: FLM=*, DAM=12.34.56.78, FLF=On, DAF=On, CR=And, and CE=Prohibit. After the MG receives the properties of the FLIPF package and the FLOPF package, the MG permits only the media streams with the source address "1.1.1.*" or the flow label "9999" to flow in the MG according to the foregoing filtering information and forbids other media streams to flow in the MG and forbids only the media streams of any flow label with the destination address "12.34.56.78" to leave the MG and permits other media streams to flow out the MG.

Based on the foregoing method, a system for filtering packets provided in an embodiment of the present disclosure includes an MGC and at least one MG, wherein the MGC is adapted to send preset packet filtering information to each MG, in which the packet filtering information uniquely identifies the basic characteristics of a media stream in an IPv6-based packet header.

In one embodiment of the disclosure, the packet filtering information in the present disclosure is used for packet filtering for a specified media stream based on the elements in a triplet. The packet filtering information may be specific to a specified termination on an MG or specific to the whole MG. The packet filtering information includes filtering condition information and filtering control information.

The filtering condition information includes the elements in a characteristic triplet of an IP packet in an IPv6-based PS network—source address, destination address, and flow label. A range or a set can be represented by the wildcard mode or partial wildcard mode. For example, the source address in partial wildcard mode "1.1.1.*" represents any address from 1.1.1.0 to 1.1.1.255, in which "*" represents any valid value.

The filtering control information is a mode of filtering packets for the media streams that meet the filtering conditions in the packet filtering information. The filtering control information includes:

source address filtering on-off: indicates whether to use the source address to participate in filtering packets for media streams;

destination address filtering on-off: indicates whether to use the destination address to participate in filtering packets for media streams;

flow label filtering on-off: indicates whether to use the flow label to participate in filtering packets for media streams;

combined relation: indicates whether the filtering condition information participates in filtering packets for the media streams separately (i.e., an OR relation exists between different entries of the filtering condition information) or participates in filtering packets for the media streams jointly (i.e., an AND relation exists between different entries of filtering condition information); and combined effect: indicates whether to permit or prohibit transfer of the media streams that meet the filtering conditions.

It should be noted that the filtering condition information may include all elements of a triplet without being affected by the corresponding elements in the filtering control information or may include any combination of the elements of the triplet, depending on whether the control on-off of the corresponding element in the filtering control information is turned on.

The method for representing packet filtering information is described below. Supposing the foregoing packet filtering information is set through the properties extended in the extended H.248 protocol, the extended properties include:

Flow Label Mask (FLM) property: indicates the flow label information. The FLM property is a string, and the value of the FLM property is consistent with the value of the flow label field in the IPv6 packet header. The FLM property may occupy 20 bits and may be expressed in the wildcard mode or partial wildcard mode.

Source Address Mask (SAM) property: indicates the source address information. The SAM property is a string, and the value of the SAM property is consistent with the value of the source address field in the IPv6 packet header. The SAM property may occupy 128 bits and may be expressed in hexadecimal segments in the wildcard mode or partial wildcard mode.

Destination Address Mask (DAM) property: indicates the destination address information. The DAM property is a string, and the value of the DAM property is consistent with the value of the destination address field in the IPv6 packet header. The DAM property may occupy 128 bits and may be expressed in hexadecimal segments in the wildcard mode or partial wildcard mode.

Flow Label Filtering (FLF) property: indicates the flow label filtering on-off information. The type of the FLF property is Boolean and the value is "Off" or "On" the default value is "Off".

Source Address Filtering (SAF) property: indicates the source address filtering on-off information. The type of the SAF property is Boolean, and the value of the SAF property is "Off" or "On" the default value is "Off".

Destination Address Filtering (DAF) property: indicates the destination address filtering on-off information. The type of the DAF property is Boolean, and the value of the DAF property is "Off" or "On" the default value is "Off".

Combined Relation (CR) property: indicates the combined relation information. The type of the CR property is Boolean, and the value of the CR property is "AND" or "OR" the default value is "AND".

Combined Effect (CE) property: indicates the combined effect information. The type of the CE property is Boolean, and the value of the CE property is "Permit" or "Prohibit" the default value is "Permit".

The MG is adapted to filter packets for the media streams to be transferred according to the packet filtering information sent from the MGC.

The properties corresponding to the foregoing packet filtering information may be set in an existing package in the H.248 protocol, i.e., Gate Management Package or set in a newly defined package for packet filtering information that uniquely identifies the basic characteristics of a media stream in an IPv6 packet header, i.e., a newly defined package may be an FL-based Ingoing Packet Filtering (FLIPF) Package that performs packet filtering for the media streams received by the MG or an FL-based Outgoing Packet Filtering (FLOPF) Package that performs packet filtering for the media streams sent by the MG.

In the practical application, when the MGC needs to perform packet filtering for media streams to ensure security or QoS, the MGC decides the filtering condition information and filtering control information to be used for the media streams received and/or sent by the MG respectively according to certain security or QoS policies, and sends them to the MG through the property items in the FLIPF package and FLOPF package. According to the relevant properties in the packet filtering information sent by the MGC, the MG performs packet filtering for the media streams that meet the filtering conditions according to the filtering control information. The filtering conditions are met if the information displayed by the filtering conditions contains the corresponding information of the media streams.

If the values of the three properties FLF, SAF, and DAF are "On", the corresponding filtering conditions are applied to comparison with the characteristics of the media streams to be filtered. If the value of the CR property is "And", the comparison result is "True" only if the characteristics of the media streams to be filtered meet the all filtering conditions applied. If the value of the CR property is "Or", the comparison result is "True" if the characteristics of the media streams to be filtered meet one of the filtering conditions applied. If the value of the CE property is "Permit", it is permitted to receive or send the media streams to be filtered only if the foregoing comparison result is "True". If the value of the CE property is "Prohibit", it is prohibited to receive or send the media streams to be filtered if the foregoing comparison result is "True".

It should be noted that if the MGC has not sent any property related to packet filtering for the media streams received or sent by the MG, no packet filtering needs to be performed by the MG for the received or sent media streams. The MGC can send the filtering condition information and the filtering control information to the MG concurrently or first send the filtering condition information first and then send the filtering control information to the MG.

If any problem occurs in the process of sending the packet filtering information and makes the MG unable to apply the packet filtering information sent by the MGC, the MG returns a corresponding error code to the MGC.

A typical application of the method of the present disclosure is described below, supposing the H.248 protocol is adopted between the MGC and the MG. The filtering condition information and the filtering control information for filtering packets for the media streams received and/or sent by the MG is set through the properties of the FLIPF package and the FLOPF package in the H.248 protocol. When the MGC does not intend to perform packet filtering for the media streams on the MG, the MGC sends no FLIPF or FLOPF package to the MG, and the MG may not perform packet filtering for the media streams received or sent by the MG according to the default value and permit any media stream to access the MG freely. When the MGC decides to only permit the media streams received by the MG which come from the address "1.1.1.*" or the flow label of which is "9999" and prohibits the media streams of any flow label that are sent by the MG to the address "12.34.56.78", in the properties of the FLIPF package sent by the MGC to the MG: FLM=9999, SAM=1.1.1.*, FLF=On, SAF=On, CR=Or, and CE=Permit; in the properties of the FLOPF package: FLM=*, DAM=12.34.56.78, FLF=On, DAF=On, CR=And, and CE=Prohibit. After the MG receives the properties of the FLIPF package and the FLOPF package, the MG permits only the media streams with the source address "1.1.1.*" or have the flow label "9999" to flow in the MG according to the foregoing filtering information and forbids other media streams to flow in the MG and forbids only the media streams of any flow label with the destination address "12.34.56.78" to leave the MG and permits other media streams to flow out the MG.

More particularly, the MGC may include a storing unit adapted to store the foregoing preset packet filtering information and a function unit adapted to send packet filtering information. As an apparatus for filtering packets in the embodiments of the present disclosure, the MG may include a function unit for receiving packet filtering information and a function unit for performing packet filtering for the media streams according to the packet filtering information.

As seen from the foregoing technical solution of the present disclosure, the MGC sets the packet filtering information that uniquely identifies the basic characteristics of a media stream in an IPv6-based packet header for the media stream. The MG uses the packet filtering information sent by the MGC to filter packets for the media streams when transferring the media streams. Moreover, the filtering conditions in the packet filtering information in the embodiments of the present disclosure are triplet information that uniquely identifies the basic characteristics of a media stream and can be obtained from the IPv6 packet header, thus reduce the complexity of the packet filtering process.

Although the disclosure has been described through some exemplary embodiments, the disclosure is not limited to such embodiments. Any modifications, equivalent substitutions and improvements made to the disclosure without departing from the spirit and scope of the disclosure shall fall within the scope of protection of the present disclosure.

What is claimed is:

1. A method for filtering packets, comprising:
    setting packet filtering information that uniquely identifies the basic characteristics of a media stream in an IPv6-based packet header; and
    using the packet filtering information to filter packets for the media stream when transferring the media stream;
    wherein the packet filtering information is set in properties in a H.248 protocol, the properties comprising at least one of:
    a Flow Label Mask (FLM) property that indicates the flow label information of the packet filtering information;
    a Source Address Mask (SAM) property that indicates source address information of the packet filtering information;
    a Destination Address Mask (DAM) property that indicates destination address information of the packet filtering information;
    a Flow Label Filtering (FLF) property that indicates flow label filtering on-off information of the packet filtering information;
    a Source Address Filtering (SAF) property that indicates source address filtering on-off information of the packet filtering information;
    a Destination Address Filtering (DAF) property that indicates destination address filtering on-off information of the packet filtering information;
    a Combined Relation (CR) property that indicates combined relation information of the packet filtering information; and
    a Combined Effect (CE) property that indicates combined effect information of the packet filtering information.

2. The method according to claim 1, wherein, the packet filtering information comprises:
    filtering condition information and filtering control information.

3. The method according to claim 2, wherein, the filtering control information comprises at least one of:
    source address filtering on-off information that indicates whether to use a source address to participate in filtering packets for the media stream;
    destination address filtering on-off information that indicates whether to use a destination address to participate in filtering packets for the media stream;
    flow label filtering on-off information that indicates whether to use a flow label to participate in filtering packets for the media stream;
    combined relation information that indicates an "AND" relationship or a "OR" relationship between filtering conditions; and
    combined effect information that indicates whether to permit or prohibit a transfer of the media stream that meets the filtering conditions.

4. The method according to claim 3, the filtering condition information comprising one or combination of the following: the source address, the destination address in a characteristic triplet of an IP packet in an IPv6-based packet header, and the flow label to identify packets in the media stream.

5. The method according to claim 1, wherein, the property is set in an H.248 protocol package.

6. The method according to claim 5, wherein, the package comprises:
    an FL-based Ingoing Packet Filtering (FLIPF) Package performing packet filtering for the media stream received by a Media Gateway (MG); and
    an FL-based Outgoing Packet Filtering (FLOPF) Package performing packet filtering for the media stream sent by the MG.

7. The method according to claim 1, wherein, filtering for the media stream comprises:
    when values of the FLF property, SAF property, and DAF property are "On", applying the corresponding filtering conditions to comparison with characteristics of the media stream to be filtered; wherein,
    when a value of the CR property is "And", a comparison result is "True" only when the characteristics of the media stream to be filtered meet the all filtering conditions applied and when the value of the CR property is "Or", the comparison result is "True" if the characteristics of the media stream to be filtered meet one of the filtering conditions applied;
    when a value of the CE property is "Permit", permitting to receive or send the media streams to be filtered only when the foregoing comparison result is "True" and when the value of the CE property is "Prohibit", prohibiting to receive or send the media stream to be filtered when the foregoing comparison result is "True".

8. A system for filtering packets, the system comprising:
    a Media Gateway Controller (MGC); and
    at least one Media Gateway (MG),
    wherein the MGC is adapted to send preset packet filtering information to each MG, the packet filtering information uniquely identifies basic characteristics of a media stream in an Internet Protocol version 6 (IPv6)-based packet header; and
    the MG is adapted to filter packets for the media stream to be transferred according to the packet filtering information sent by the MGC;
    wherein the packet filtering information is set in properties in the H.248 protocol and the properties comprise at least one of:
    a Flow Label Mask (FLM) property that indicates the flow label information of the packet filtering information;
    a Source Address Mask (SAM) property that indicates source address information of the packet filtering information;
    a Destination Address Mask (DAM) property that indicates destination address information of the packet filtering information;
    a Flow Label Filtering (FLF) property that indicates flow label filtering on-off information of the packet filtering information;
    a Source Address Filtering (SAF) property that indicates source address filtering on-off information of the packet filtering information;
    a Destination Address Filtering (DAF) property that indicates destination address filtering on-off information of the packet filtering information;

a Combined Relation (CR) property that indicates combined relation information of the packet filtering information; and a Combined Effect (CE) property that indicates combined effect information of the packet filtering information.

9. The system according to claim 8, wherein, the packet filtering information comprises:
   filtering condition information; and
   filtering control information.

10. The system according to claim 9, wherein, the filtering control information comprises at least one of:
   source address filtering on-off information that indicates whether to use a source address to participate in filtering packets for the media stream;
   destination address filtering on-off information that indicates whether to use a destination address to participate in filtering packets for the media stream;
   flow label filtering on-off information that indicates whether to use a flow label to participate in filtering packets for the media stream;
   combined relation information that indicates an "AND" relationship or an "OR" relationship between filtering conditions; and
   combined effect information that indicates whether to permit or prohibit transfer of the media stream that meets the filtering conditions.

11. The system according to claim 9, wherein the filtering condition information comprises one or a combination of: a source address, a destination address in a characteristic triplet of an Internet Protocol (IP) packet in an IPv6-based packet header, and a flow label to identify packets in the media stream.

12. An apparatus for filtering packets, the apparatus comprising:
   a first unit that receives packet filtering information, in which the packet filtering information uniquely identifies basic characteristics of a media stream in an Internet Protocol version 6 (IPv6)-based packet header; and
   a second unit that filters packets for the media stream according to the received packet filtering information;
   wherein the packet filtering information is set in properties in the H.248 protocol and the properties comprise at least one of:
   a Flow Label Mask (FLM) property that indicates the flow label information of the packet filtering information;
   a Source Address Mask (SAM) property that indicates source address information of the packet filtering information;
   a Destination Address Mask (DAM) property that indicates destination address information of the packet filtering information;
   a Flow Label Filtering (FLF) property that indicates flow label filtering on-off information of the packet filtering information;
   a Source Address Filtering (SAF) property that indicates source address filtering on-off information of the packet filtering information;
   a Destination Address Filtering (DAF) property that indicates destination address filtering on-off information of the packet filtering information;
   a Combined Relation (CR) property that indicates combined relation information of the packet filtering information; and
   a Combined Effect (CE) property that indicates combined effect information of the packet filtering information.

13. The apparatus according to claim 12, wherein, the packet filtering information comprises:
   filtering condition information and filtering control information.

14. The apparatus according to claim 13, wherein, the filtering control information comprises at least one of:
   source address filtering on-off information that indicates whether to use a source address to participate in filtering packets for the media stream;
   destination address filtering on-off information that indicates whether to use a destination address to participate in filtering packets for the media stream;
   flow label filtering on-off information that indicates whether to use a flow label to participate in filtering packets for the media stream;
   combined relation information that indicates an "AND" relationship or an "OR" relationship between filtering conditions; and
   combined effect information that indicates whether to permit or prohibit transfer of the media stream that meets the filtering conditions.

15. The apparatus according to claim 13, wherein, the filtering condition information comprises one or combination of: a source address, a destination address in a characteristic triplet of an Internet Protocol (IP) packet in an IPv6-based packet header, and a flow label to identify packets in the media stream.

* * * * *